(12) United States Patent
Taylor (10) Patent No.: US 10,554,303 B2
(45) Date of Patent: Feb. 4, 2020

(54) OPTICAL COMMUNICATION SYSTEM, TRANSMITTER AND RECEIVER

(71) Applicant: Grant Taylor, North York (CA)

(72) Inventor: Grant Taylor, North York (CA)

(73) Assignee: Grant Taylor, North York, Ontario (CA)

( * ) Notice: Subject to any disclaimer, the term of this patent is extended or adjusted under 35 U.S.C. 154(b) by 0 days.

(21) Appl. No.: 16/288,814

(22) Filed: Feb. 28, 2019

(65) Prior Publication Data

US 2019/0268070 A1    Aug. 29, 2019

Related U.S. Application Data

(60) Provisional application No. 62/636,456, filed on Feb. 28, 2018.

(51) Int. Cl.
| | |
|---|---|
| *H04B 10/00* | (2013.01) |
| *H04B 10/116* | (2013.01) |
| *H04B 10/50* | (2013.01) |
| *H04B 17/327* | (2015.01) |
| *H04B 10/524* | (2013.01) |
| *H04B 10/556* | (2013.01) |

(52) U.S. Cl.
CPC ......... *H04B 10/116* (2013.01); *H04B 10/502* (2013.01); *H04B 10/50575* (2013.01); *H04B 10/524* (2013.01); *H04B 10/556* (2013.01); *H04B 17/327* (2015.01)

(58) Field of Classification Search
CPC . H04B 10/116; H04B 10/112; H04B 10/1123; H04B 10/114; H04B 10/1143; H04B 10/1149; H04B 10/40; H04B 10/43; H04B 10/50575; H04B 10/6931; H04B 10/516; H04B 10/502
USPC ....... 398/118, 119, 128, 172, 130, 127, 129, 398/131, 135, 136, 159, 192, 193, 194, 398/195, 202, 208, 209, 182, 183, 186; 250/214 A, 214 LA, 214 AG; 330/59, 330/308
See application file for complete search history.

(56) References Cited

U.S. PATENT DOCUMENTS

| | | | |
|---|---|---|---|
| 7,215,891 B1 * | 5/2007 | Chiang ................. | H04B 10/40 398/137 |
| 2003/0223756 A1 * | 12/2003 | Tatum ................... | H04B 10/40 398/135 |

* cited by examiner

*Primary Examiner* — Hanh Phan
(74) *Attorney, Agent, or Firm* — Burris Law, PLLC (57) ABSTRACT

There is provided an optical communication system comprising: a transmitter comprising: a modulator configured to output a digital signal representing information to be transmitted; a biaser configured to output a bias level; a drive level controller configured to output a control signal; a switch electrically connected to the modulator, wherein the switch receives the digital signal and a reference voltage set by the control signal; and at least one light emitting diode (LED) electrically connected to the switch and the biaser. The LED is configured to emit light and pulse at varying power levels between the bias level and the reference voltage. The system further comprises a receiver comprising: a detector configured to receive light emitted by the LED and output a detected signal; and a demodulator configured to receive the detected signal and output demodulated information.

20 Claims, 9 Drawing Sheets

OPTICAL COMMUNICATION SYSTEM, TRANSMITTER AND RECEIVER

CROSS-REFERENCE TO RELATED APPLICATIONS

This application claims priority to and the benefit of U.S. Provisional Application No. 62/636,456 filed on Feb. 28, 2018. The disclosure of the above application is incorporated herein by reference.

FIELD

The present disclosure relates to a communication system and in particular, to an optical communication system, transmitter and receiver.

BACKGROUND

The statements in this section merely provide background information related to the present disclosure and may not constitute prior art.

There is an ever increasing amount of information being communicated. Various forms of communication have become ubiquitous in modern society. For example, cellular communication using a variety of broadband network technology, such as 3G and 4G, is common place. Furthermore, with the Internet of Things (IoT) becoming a reality, short range wireless technology, such as Bluetooth, is common place in electronic devices.

Optical communication is one form of communication that has been present since as early as the 1900s. Smoke signals, beacon fires and signal lamps using Morse code, and signal flags are early forms of optical communication technologies. More recently fiber-optic communication has become commonplace in the telecommunications industry.

The present disclosure addresses the issues of optical communication.

SUMMARY

In accordance with one form of the present disclosure there is provided an optical communication system comprising: a transmitter comprising: a modulator configured to output a modulated digital signal representing information to be transmitted; a biaser configured to output a bias level; a drive level controller configured to output a control signal; a switch electrically connected to the modulator, wherein the switch receives the digital signal and a reference voltage set by the control signal; and at least one light emitting diode (LED) electrically connected to the switch and the biaser, wherein the LED is configured to emit light and pulse at varying power levels between the bias level and the reference voltage; and a receiver comprising: a detector configured to receive light emitted by the LED and output a detected signal; and a demodulator configured to receive the detected signal and output demodulated information.

In one or more forms of the present disclosure, the digital signal alters a duty cycle of the LED. In one or more aspects, the digital signal alters the duty cycle between a frequency of 20 kHz to 30 kHz.

In one or more forms, the digital signal is a pulse width modulated (PWM) digital signal or a pulse phase modulated (PPM) digital signal.

In one or more forms, the control signal is a preset signal.

In one or more forms, the control signal is variable such that reference voltage may be varied.

In one or more forms, the transmitter further comprises a voltage converter controlled by the control signal and configured to output the reference voltage.

In one or more forms of the present disclosure, modulator comprises a first linear stage and a second linear stage. In one or more aspects, the first linear stage comprises a frequency shift keying (FSK) modulator configured to output an analog FSK signal. In one or more aspects, the second linear stage comprises a multiple frequency shift keying (MFSK) modulator configured to output an analog MFSK signal. In one or more aspects, the modulator comprises an amplifier configured to combine an analog signal output by the first linear stage and an analog signal output by the second linear stage using frequency division multiplexing (FDM) into the digital signal.

In one or more aspects, the system further comprises a power source electrically connected to the transmitter.

In one or more aspects, the plurality of LEDs comprises four (4) LEDs.

In one or more aspects, the transmitter is integrated into a traffic light and the receiver is integrated into a vehicle. In one or more aspects, the digital signal represent state information of the traffic light.

In one or more aspects, the transmitter is integrated into a first vehicle and the receiver is integrated into a second vehicle.

In accordance with a further aspect there is provided a transmitter comprising: a modulator configured to output a digital signal representing information to be transmitted; a biaser configured to output a bias level; a drive level controller configured to output a control signal; a switch electrically connected to the modulator, wherein the switch receives the digital signal and a reference voltage set by the control signal; and at least one light emitting diode (LED) electrically connected to the switch and the biaser, wherein the LED is configured to emit light and pulse at varying power levels between the bias level and the reference voltage.

In one or more aspects, the digital signal alters a duty cycle of the LED.

In one or more aspects, the digital signal alters the duty cycle between a frequency of 20 kHz to 30 kHz.

In one or more aspects, the digital signal is a pulse width modulated (PWM) digital signal or a pulse phase modulated (PPM) digital signal In one or more aspects, the control signal is a preset signal.

In one or more aspects, the control signal is variable such that reference voltage may be varied.

In one or more aspects, the transmitter further comprises a voltage converter controlled by the control signal and configured to output the reference voltage.

In one or more aspects, the modulator comprises a first linear stage and a second linear stage. In one or more aspects, the first linear stage comprises a frequency shift keying (FSK) modulator configured to output an analog FSK signal. In one or more aspects, the second linear stage comprises a multiple frequency shift keying (MFSK) modulator configured to output an analog MFSK signal. In one or more aspects, the modulator comprises an amplifier configured to combine an analog signal output by the first linear stage and an analog signal output by the second linear stage using frequency division multiplexing (FDM) into the digital signal.

In accordance with a further aspect there is provided a receiver comprising: a detector configured to receive light emitted by an LED and output a detected signal; and a demodulator configured to receive the detected signal and output demodulated information.

In one or more aspects, the detector comprises a darlington transistor configured to receive a feedback signal to control the sensitivity of the darlington transistor.

In one or more aspects, the demodulator is configured to receive a received signal strength indicator (RSSI). In one or more aspects, the RSSI is processed by the demodulator to calculate the distance between the receiver and the LED.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
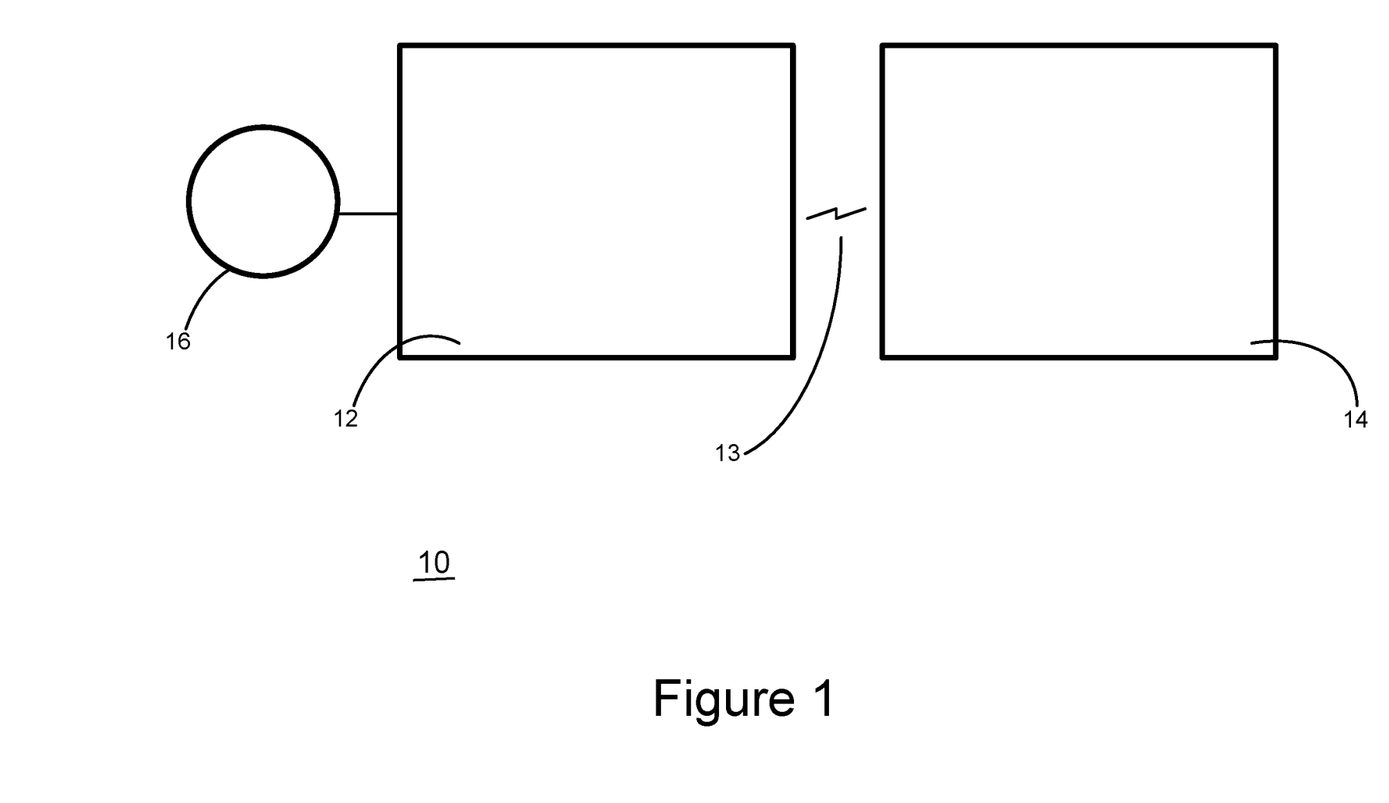
FIG. 1 is a block diagram of an optical communication system in accordance with the teachings of the present disclosure.

For convenience, like numerals in the description refer to like structures in the drawings. Referring to FIG. 1, a block diagram of an optical communication system is illustrated generally as reference numeral 10. The optical communication system 10 comprises a transmitter 12, a receiver 14 and a power source 16 electrically connected to the transmitter 12. The transmitter 12 is configured to transmit information using light 13 as will be described. The receiver 14 is configured to receive the light 13 transmitted by the transmitter 12 and decode the received light 13 to retrieve the information as will be described.

Figure 2:
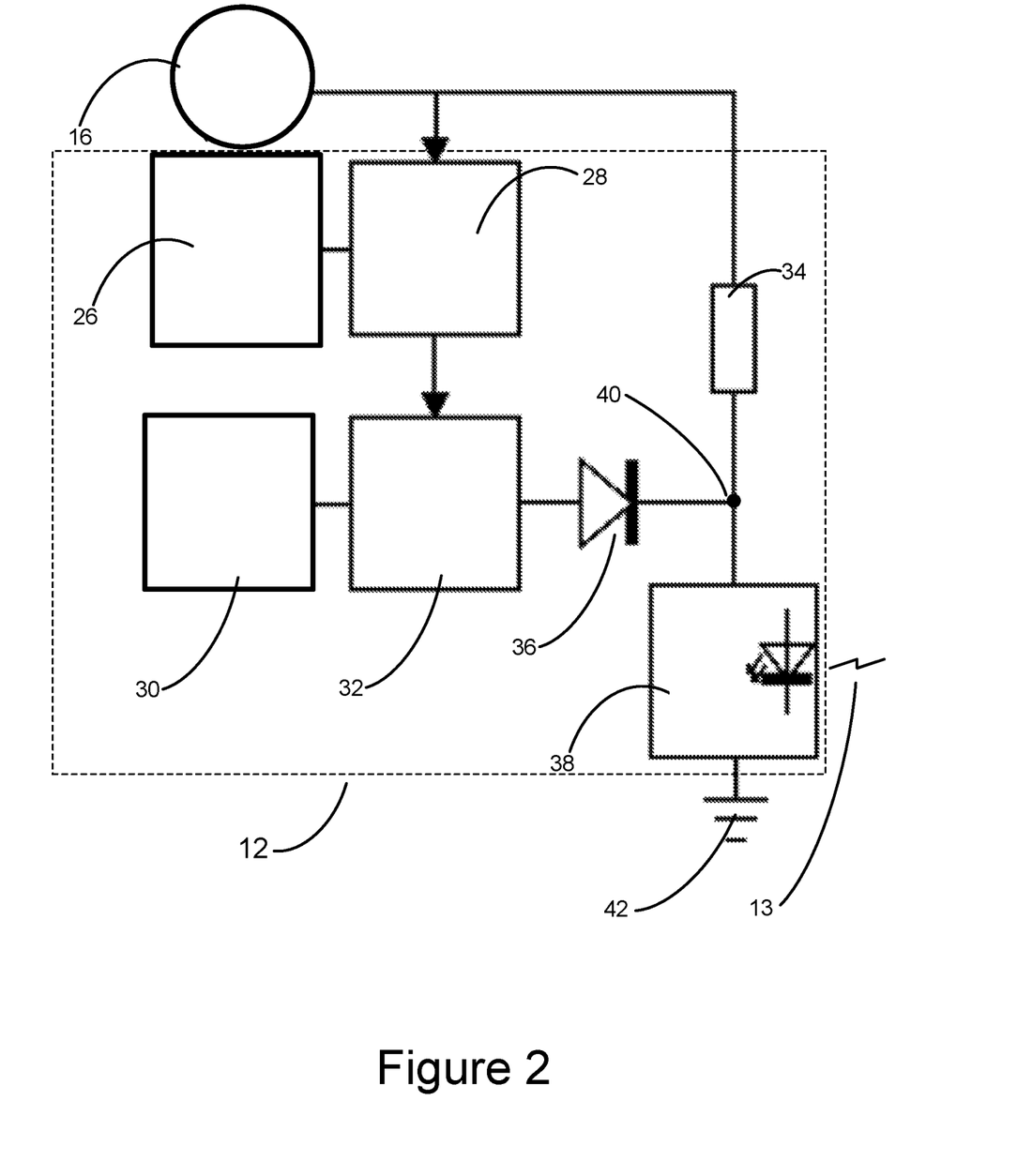
FIG. 2 is a block diagram of a transmitter and a power source of the optical communication system of FIG. 1.

Referring to FIG. 2, a block diagram of the transmitter 12 and the power source 16 of FIG. 1 is shown. The transmitter 12 comprises a drive level controller 26, a voltage converter 28, a modulator 30, a switch 32, a biaser 34, a diode 36, a light emitting diode (LED) array 38 and a node 40.

The power source 16 is electrically coupled to the switch 32 via the voltage converter 28. The power source 16 is also electrically coupled to the node 40 via the biaser 34. The drive level controller 26 is electrically coupled to the switch 32 via the voltage converter 28. The voltage converter 28 is electrically coupled to the switch 32. The modulator 30 is electrically coupled to the switch 32. The switch 32 is electrically coupled to the node 32 via the diode 36. The switch 32 is electrically coupled to the voltage converter 28. The switch 32 is electrically coupled to the modulator 30. The biaser 34 is electrically coupled to the power source 16. The biaser is electrically coupled to the node 40. The node 40 is electrically coupled to the switch 32 via the diode 36. The node 40 is electrically coupled to the power source 16 via the biaser 40. The node 40 is electrically coupled to the LED array 38.

The power source 16 outputs a DC signal to the voltage converter 28 and the biaser 34. The drive level controller 26 outputs a control signal to the voltage converter 28. The control signal controls the signal output by the voltage converter 28 to the switch 32. In this aspect of the present disclosure, the drive level controller 26 has a preset level that pre-determines the control signal. The signal output by the voltage converter 28 is a voltage that powers the LED array 38. As the voltage converter 28 is controlled by the control signal from the drive level controller 26, the voltage received by the switch 32 is a predetermined reference voltage. The voltage output by the switch 32 varies between two set points, the predetermined reference voltage and 0 V depending on the output of the modulator 30 as will be described. The LED array 38 comprises at least one LED. The LED array 38 is electrically connected to ground 42. The LEDs in the LED array 38 emit light 13 and pulse at varying power levels.

The modulator 30 is configured to output a digital control signal to the switch 32. In this aspect, the switch 32 is a solid state switch. The digital control signal from the modulator 30 controls a signal output by the switch 32 up to the reference voltage output by the voltage converter 28. As previously stated, the switch 32 is electrically coupled to the diode 36. In this aspect, the diode 36 is a high speed Schottky diode.

The biaser 34 receives the DC signal from the power source 16. The biaser 34 outputs a signal to the LED array 38 via the node 40. The biaser 34 (e.g., a bias circuit) outputs a minimum bias level voltage to the LED array 38 such that the LEDs in the LED array 38 do not turn off entirely. Ensuring the LEDs in the LED array 38 do not turn off entirely reduces power loss. The diode 36 inhibits the signal output by the biaser 34 from feeding back into the switch 32. In some aspects of the present disclosure, the diode 36 prevents the signal output by the biaser 34 from feeding back into the switch 32. Non-limiting examples of the biaser 34, and other biasers disclosed herein, include a fixed biaser, a collector feedback biaser, a fixed biaser with emitter resistor, a voltage divider with AC bypass capacitor biaser and an emitter biaser.

As previously stated, the LEDs in the LED array 38 emit light 13 and pulse at varying power levels. Specifically, the power level of the LED array 38 varies between the minimum bias level voltage set by the biaser 34 and the reference voltage set by the control signal output by the drive level controller 26. In this aspect, the LED 38 comprises 4 LEDs. In this aspect, the LEDs in the LED array 38 operate in the infrared (IR) spectrum. Those of skill in the art will appreciate that other spectrums are possible. In another aspect, the LEDs in the LED array 38 operate in the visible light spectrum or the ultraviolet (UV). The visible light spectrum may include red (740 to 620 nm), green (575 to 500 nm) and amber (620 to 585 nm) wavelengths.

Figure 3:
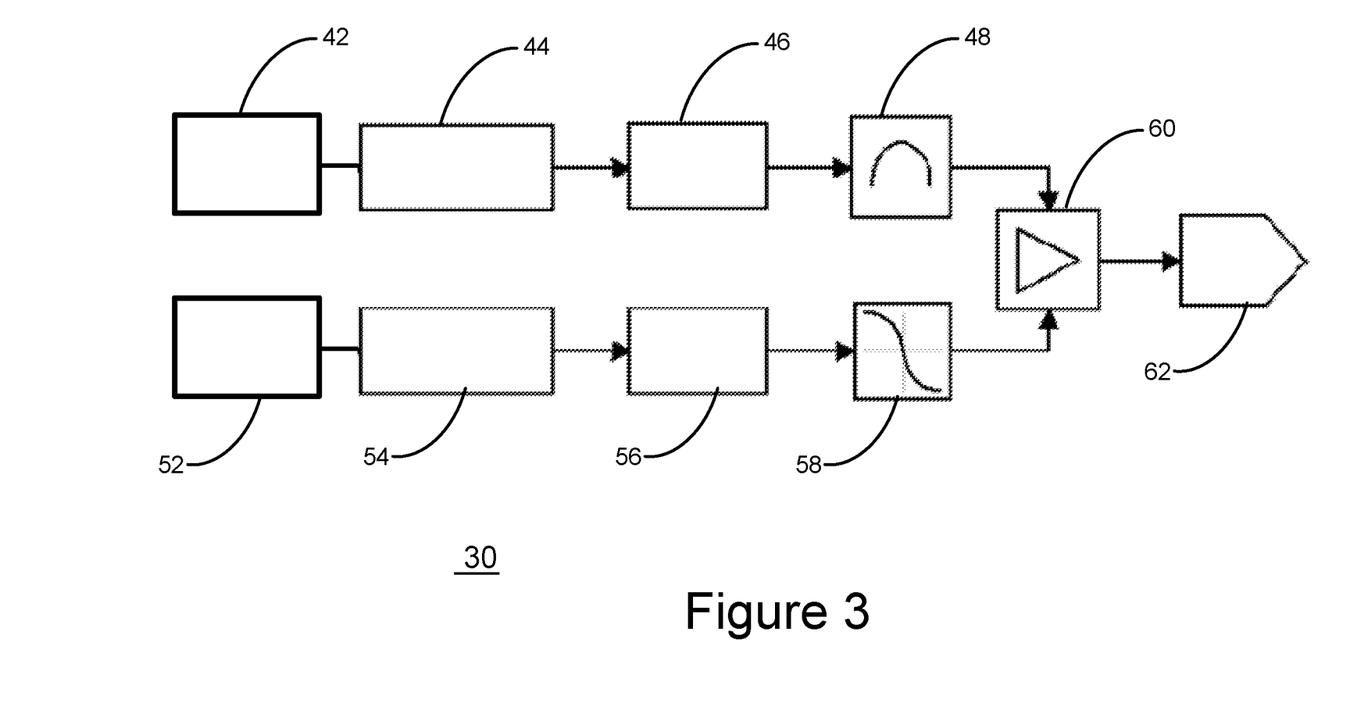
FIG. 3 is a block diagram of a modulator of the transmitter of FIG. 2.

As previously stated, the modulator 30 is configured to output a digital signal to the switch 32. Referring to FIG. 3, a block diagram of the modulator 30 of FIG. 2 is shown. The modulator 30 comprises a first linear analog stage, a second linear analog stage, an amplifier 60 and a driver 62. The first linear analog stage is electrically coupled to the amplifier 60. The second linear analog stage is electrically coupled to the amplifier 60. The amplifier 60 is electrically coupled to the driver 62.

The first linear analog stage comprises a frequency-shift keying (FSK) communication interface 42, an FSK micro-controller 44, an FSK modulator 46 and a band pass filter 48.

The FSK input interface 42 is electrically coupled to FSK micro-controller 44. The FSK micro-controller 44 is electrically coupled to the FSK modulator 46. The FSK modulator 46 is electrically coupled to the band pass filter 48. The FSK input interface 42, FSK microcontroller 44, the FSK modulator 46 and the band pass filter 48 form the first linear analog stage. The signal output by the FSK modulator 46 represents a first channel of information to be transmitted.

The FSK input interface 42 is configured to receive information to be transmitted. The FSK input interface 42 may receive information input by a user, receive information from a remote source or receive information generated by a light source that the transmitter 12 is integrated with.

The FSK micro-controller 44 is configured to control the FSK modulator 46 such that the FSK modulator 46 encodes the information received by the FSK input interface 42 into an analog FSK signal. The analog FSK signal is band pass filtered by the band pass filter 48. In this aspect, the band pass filter 48 operates between a range of approximately 6 to 12 kHz.

The FSK modulator 46 modulates the frequency of a carrier wave according to the information input into the FSK input interface 42. The information input into the FSK input interface 42 is broken into 8 bit data blocks. Seven (7) of each of the data blocks are data to be transmitted. The eighth bit of each data block is a forward error check (FEC) bit used in error correction. The FSK input interface 42 receives information that is not received by a multiple FSK (MFSK) input interface 52 as will be described. In this aspect, this additional information comprises a serial number of the transmitter 12, a location of the transmitter 12, a time of message transmission, navigation data and any other information that cannot fit on the information input into the MFSK input interface 52.

The second linear analog stage comprises the MFSK communication interface 52, a MFSK micro-controller 54, a MFSK modulator 56 and a low pass filter 58. The MFSK input interface 52 is electrically coupled to MFSK micro-controller 54. The MFSK micro-controller 54 is electrically coupled to the MFSK modulator 56. The MFSK modulator 56 is electrically coupled to the low pass filter 58. The MFSK input interface 52, MFSK microcontroller 54, the MFSK modulator 56 and the low pass filter 58 form the second linear analog stage. The signal output by the MFSK modulator 56 represents a second channel of information to be transmitted.

The MFSK input interface 52 is configured to receive information to be transmitted. In this aspect, the MFSK input interface 52 is configured to receive different information than the information received by the FSK input interface 42. The MFSK input interface 52 may receive information input by a user, receive information from a remote source or receive information generated by the light source that the transmitter 12 is integrated with.

The MFSK micro-controller 54 is configured to control the MFSK modulator 56 such that the MFSK modulator 56 encodes the information received by the MFSK input interface 52 into an analog MFSK signal. The analog MFSK signal is low pass filtered by the low pass filter 58. In this aspect, the low pass filter 58 operates within a range of approximately 0 to 3 kHz.

The information input into the MFSK input interface 52 is broken into 5 bit data blocks. Four (4) of each of the data blocks are data to be transmitted. The fifth bit of each data block is a FEC bit used in error correction. In this aspect, the information input into the MFSK input interface 52 is converted into data blocks using the Varicode character encoding scheme. The Varicode character encoding scheme generally offers a reduction in the number of data blocks required for a given message compared to ASCII character encoding. As shown in Table 1 below, the text string "Hello test" requires 14 data blocks when a Varicode character encoding scheme is used while 20 data blocks are required when an ASCII character encoding is used.

TABLE 1

| Character Encoding Scheme | Text 'H' 'e' 'l' 'l' 'o' ' ' 't' 'e' 's' 't' | Number of Data Blocks Used |
|---|---|---|
| Varicode | 5,0 1 0,9 0,9 3 0 2 1 0,8 2 | 14 |
| ASCII in hexadecimal | 48 65 6C 6C 6F 20 74 65 73 74 | 20 |

While a particular size of data blocks of information input into the MFSK input interface 52 has been described, those of skill in the art will appreciate that other sizes are possible. The size of the data blocks may be varied depending on the amount of information that needs to be sent. For example, data blocks of 5 or fewer bits may be used when short essential information needs to be sent, and data blocks of more than 5 bits when longer messages need to be sent. Furthermore, when transmission speed is of high importance in the system 10 performance, the size of the data blocks may be 5 or fewer bits in length.

As the information input into the MFSK input interface 52 is broken into 5 bit data blocks and the information input into the FSK input interface 42 is broken into 8 bit data blocks, data blocks generated from the MFSK input interface 52 can be transmitted at a higher bitrate than data blocks generated from the FSK input interface 42. Thus, the second channel of information may be transmitted at a higher bitrate from the transmitter 12 than the first channel of information as the bitrate of the MFSK modulator 56 is higher than the bitrate of the FSK modulator 46. In this aspect, the bitrate of the FSK modulator 46 is approximately eight (8) data blocks (or symbols) per second (baud). In another aspect, the bitrate of the FSK modulator 46 is approximately sixteen (16) data blocks (or symbols) per second (baud). In this aspect, the bitrate of the MFSK modulator 56 is approximately twelve hundred (1200) data blocks (or symbols) per second (baud).

The MFSK modulator 56 encodes the information input into the MFSK input interface 52 into tone bursts of various frequencies to convey the information. As the number of tones used increases, the data throughput increases and the carrier to noise performance is reduced. In this aspect, a forty (40) tone encoding scheme was used. The MFSK modulator 56 encodes the information input into the MFSK input interface 52 using differential encoding. In differential encoding information is encoded by the relative difference between adjacent tones.

While a forty (40) tone encoding scheme has been described, those of skill in the art will appreciate that other encoding schemes may be used. In another aspect, the number of tones is any one of 10, 20 and 30. Decreasing the number of tones increases the tone spacing and increases the bandwidth. A comparison of the symbol rate or number of tones, bandwidth and tone spacing is show in Table 2.

TABLE 2

| Symbol Rate | Bandwidth (Hz) | Tone Spacing (Hz) |
|---|---|---|
| 10 | 600 | 15 |
| 20 | 1200 | 30 |
| 30 | 1800 | 45 |
| 40 | 2400 | 60 |

Figure 4:
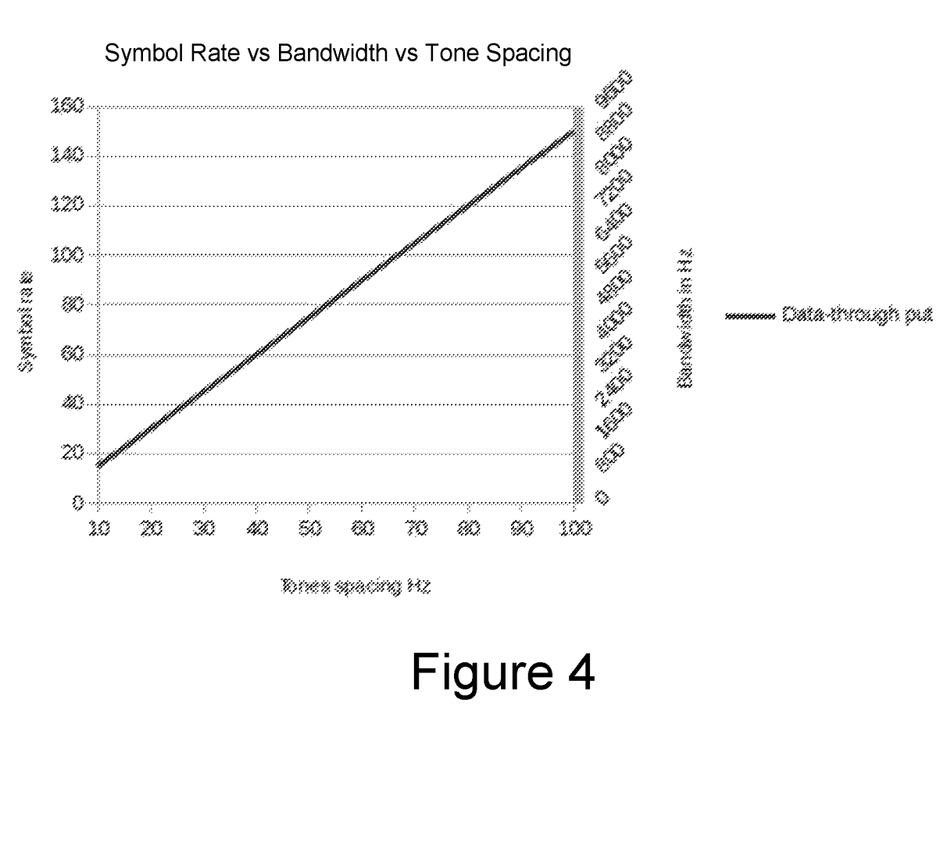
FIG. 4 is a graph of Symbol Rate, Bandwidth and Tone Spacing representing the data-through put for the MFSK modulator of the modulator of FIG. 3.

A graphical representation of the symbol rate, bandwidth and tone spacing representing the data-through put is shown in FIG. 4. As the tone spacing increases from 10 to 100 Hz, the symbol rate increases from approximately 20 to over 140 and the bandwidth increases from under 600 Hz to 8800 Hz.

While the modulator 30 has been described as having a first linear stage and a second linear stage, those of skill in the art will appreciate that other configurations are possible. In another aspect, the modulator 30 comprises only a single linear stage comprised of the MFSK input interface 52, MFSK micro-controller 54, the MFSK modulator 56 and the low pass filter 58.

The amplifier 60 receives the analog signals from the band pass filter 48 and the low pass band filter 58. In this aspect, the amplifier 60 is a class D amplifier. The amplifier 60 combines the analog signals from the band pass filter 48 and the low pass band filter 58 using frequency division multiplexing (FDM). The amplifier 60 then outputs a digital signal to the driver 62.

The driver 62 receives the digital signal from the amplifier 60. The driver 62 modulates the digital signal and generates a modulated digital signal that is received by the switch 32. The modulated digital signal output by the driver 62 alters the duty cycle of the LEDs in the LED array 38. The duty cycle switching speed ranges between approximately 20 kHz and 30 kHz. Thus, the frequency of the driver 62 is approximately 20 kHz to 30 kHz. At this frequency, people will not see noticeable flicker when looking at the LEDs of the LED array 38. While a particular frequency has been described, those of ordinary skill in the art will appreciate that other frequencies are possible.

In this aspect, the driver 62 is a pulse phase modulator. The pulse phase modulator is configured to generate a pulse phase modulated (PPM) signal. In another aspect, the driver 62 is a pulse width modulator. The pulse width modulator is configured to generate a pulse width modulated (PWM) signal.

As previously stated, the LEDs in the LED array 38 emit light and pulse at varying power levels. The varying power levels are between the bias level set by the biaser 34 and the reference voltage set by the control signal output by the drive level controller 26. The driver 62 alters the duty cycle of the LEDs in the LED array 38 thereby altering the time the LEDs are powered and not powered. The respective time the LEDs are powered or not powered is in accordance with the amplified signal output by the amplifier 60 which represents the information encoded by the FSK modulator 46 and the MFSK modulator 56. As the LEDs never fall below the bias level set by the biaser 34, the LEDs are never fully off. Accordingly, power is saved and the life cycle of the LEDs is not unduly shortened.

Figure 5:
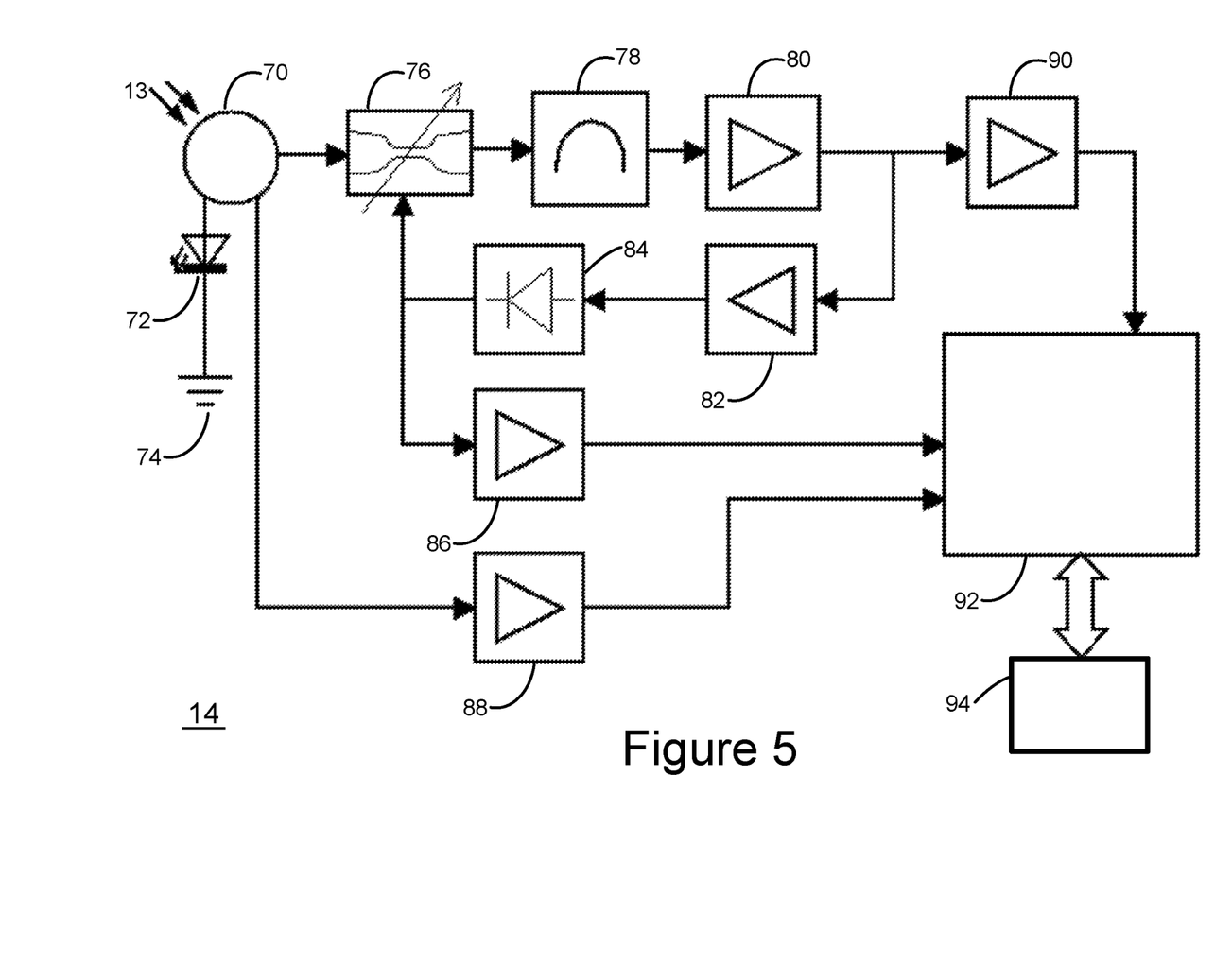
FIG. 5 is a block diagram of a receiver of the optical communication system of FIG. 1.

Referring now to FIG. 5, a block diagram of the receiver 14 of FIG. 1 is shown. The receiver 14 comprises a detector 70, a receiver LED 72, an automatic gain controller (AGC) 76, a band pass filter 78, a pre-amplifier 80, an amplifier 82, a diode 84, a first DC amplifier 86, a second DC amplifier 88, a driver amplifier 90, a demodulator 92 and an output interface 94. The detector 70 is electrically coupled to the receiver LED 72. The detector 70 is electrical coupled to the AGC 76. The detector 70 is electrically coupled to the demodulator 82 via the second DC amplifier 88. The receiver LED 72 is electrically coupled to ground 74. The AGC 76 is electrically coupled to the demodulator 92 via the band pass filter 78, pre-amplifier 80 and driver amplifier 90. The AGC 76 is further electrically coupled to the demodulator 92 via the band pass filter 78, pre-amplifier 80, amplifier 82 and diode 84. The AGC 76 is further electrically coupled to the demodulator 92 via the first DC amplifier 86. The demodulator 92 is electrically coupled to the output interface 94.

The detector 70 is configured to receive light 13 emitted by LEDs of the LED array 38 of the transmitter 12 and convert the light into a signal as will be described. The receiver LED 72 is configured to emit light when the detector 70 detects an emitted light signal such that an operator may confirm that the detector 70 is functioning.

The AGC 76 is configured to maintain the output level of the signal output by the detector 70 within a preset range. The preset range is pre-determined based on the operating range of the demodulator 92. The operating range of the demodulator 92 is from near 0 V to up to approximately 5 V.

The band pass filter 78 is configured to limit the frequency range of the signal output by the AGC 76. If the frequency of the driver 62 is 30 kHz, for example, the frequency of the AGC 76 ranges from 1 kHz to 15 kHz. The band pass filter 78 removes unwanted noise from the signal output by the AGC 76. The band pass filter 78 is electrically connected to the pre-amplifier 80. The pre-amplifier 80 amplifies the signal output by the band pass filter 80. The pre-amplifier 80 is electrically connected to the amplifier 82 and the driver amplifier 90. The amplifier 82 amplifies the signal output by the pre-amplifier 80. The amplifier 82 is electrically connected to the diode 84. In this aspect, the diode 84 is a half wave rectifier. The half wave rectifier converts the input AC voltage to an output DC voltage. The diode 84 is electrically connected to the AGC 76 and a first DC amplifier 86. The diode 84 is configured to output a feedback signal to the AGC 76. The feedback signal is received by the AGC 76. The AGC 76 is configured to utilize the feedback signal to maintain the output level of the signal output by the detector 70 within the preset range.

The AGC 76 is configured to further output a received signal strength indicator (RSSI). The RSSI is an indication of the signal strength of the light detected by the detector 70. The RSSI is output from the AGC 76 and amplified by the first DC amplifier 86. The first DC amplifier 86 is electrically connected to the demodulator 92. The driver amplifier 90 is electrically connected to the demodulator 92. The preset level of the drive level controller 26 of the transmitter 12 is known to the demodulator 92. Thus, the RSSI is used to calculate the distance between the transmitter 12 and the receiver 14 at the demodulator 92 given the known preset level of the drive level controller 26 of the transmitter 12.

The driver amplifier 90 is configured to amplify the signal output by the pre-amplifier 80. The detector 70 is electrically connected to the second DC amplifier 88. The second DC amplifier 88 is configured to amplify the signal output by the AGC 76. The second DC amplifier 88 is electrically connected to the demodulator 92. The demodulator 92 thus receives an amplified signal from the detector 70 via the second DC amplifier 88, a band pass filtered amplified signal from the AGC 76 via the driver amplifier 90 and an amplified RSSI from the AGC 76 via the first DC amplifier 86.

As previously stated, the RSSI is amplified by the first DC amplifier 86. The demodulator 92 is configured to process the RSSI from the first DC amplifier 86 to calculate the distance between the transmitter 12 and the receiver 14. The demodulator 92 is further configured to process the signal from the second DC amplifier 88 to increase the accuracy of the calculated distance. The demodulator 92 is configured to demodulate the received signals into digital information. In this aspect, the demodulator 92 is a digital signal processor (DSP). The demodulator 92 is electrically connected to an output interface 94. The output interface 94 is configured to receive the digital information converted from the received signals from the demodulator 92. The output interface 94 is configured to output this digital information such that the information may be received by an operator of the receiver 14. In this aspect, the output interface 94 is a display screen such that a user may view the information.

Furthermore, in this aspect, the output interface 94 is connected to a vehicle processor (not shown) into which the receiver 14 is integrated. The vehicle processor communicates state information of the vehicle to the output interface 94 which is processed to further determine the information output by the output interface 94 as will be described.

While the demodulator 92 has been described as a DSP, those of skill in the art will appreciate that other elements are possible. In another aspect, the demodulator 92 is a microcontroller chip.

While a particular output interface 94 has been described, those of skill in the art will appreciate that other output interfaces are possible. For example, the output interface 94 may be a speaker that converts text to speech, a light source or some other form of information communication mechanism.

Figure 6:
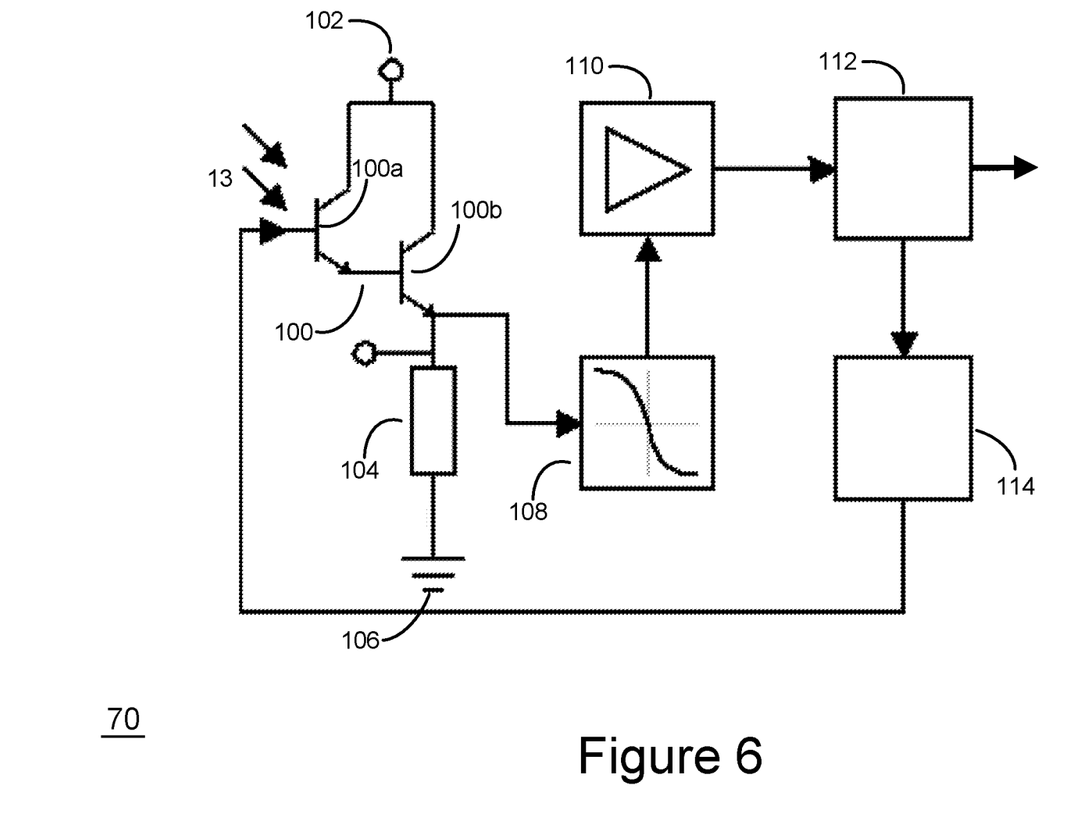
FIG. 6 is a block diagram of a detector of the receiver of FIG. 5.

Referring now to FIG. 6, a block diagram of the detector 70 is shown. The detector 70 comprises a darlington transistor 100, a power supply connector 102, resistor 104, a low pass filter 108, a DC amplifier 110, a detector AGC 112 and a detector biaser 114.

The darlington transistor 100 is electrically coupled to the power supply connector 102. The darlington transistor 100 is electrically coupled to the resistor 104. The darlington transistor 100 is electrically coupled to the detector AGC 112 via the low pass filter 108 and the DC amplifier 110. The darlington transistor 100 is electrically coupled to the detector AGC 112 via the biaser 114. The resistor 104 is electrically coupled to the darlington transistor 100 and electrically coupled ground 106.

Light 13 emitted by the LED array 38 of the transmitter 14 is received by the darlington transistor 100. The darlington transistor 100 is formed from two NPN bipolar transistors, a first transistor 100a and a second transistor 100b. The first and second transistors 100a and 100b are electrically connected. Specifically, the emitter of the first transistor 100a is electrically connected to the base of a second transistor 100b, and the collector of the first transistor 100a is electrically connected to the collector of the second transistors 100b. The collectors of the first and second transistors 100a and 100b are connected to a power supply connector 102. The power supply connector 102 is electrically connected to a DC power supply (not shown). In this aspect, the DC power supply if a 5 V power supply. As previously stated, the darlington transistor 100 receives light emitted by the LED array 38 of the transmitter. The emitter of the second transistor 100b of the darlington transistor 100 outputs a signal that corresponds to the received light. The emitter of the second transistor 100b is electrically connected to the resistor 104. The resistor is electrically connected to ground 106. The resistor 104 sets the bias for the darlington transistor 100. The low pass filter 108 is electrically connected to the emitter of the second transistor 100b. In this aspect, the operating range of the low pass filter is below 100 Hz. The low pass filter 108 is electrically connected to the DC amplifier 110. The low pass filter 108 outputs a filtered signal to the DC amplifier 110. The DC amplifier 110 amplifies the filtered signal. The DC amplifier 110 is electrically connected to the detector AGC controller 112. The detector AGC 112 maintains the amplified signal received from the DC amplifier 110. The detector AGC 112 is electrically connected to a detector biaser 114. The detector biaser 114 is also electrically connected to the base of the first transistor 100a of the darlington transistor 100. The detector biaser 114 sends a feedback signal to the darlington transistor 100 to control the sensitivity of the darlington transistor 100. The feedback signal from the detector biaser 114 feeds into the base of the first transistor 100a altering the biasing of the first transistor 100a to control the sensitivity of the darlington transistor 100. This provides that the darlington transistor 100 is adjusted to receive emitted light in an improved manner.

In use, the transmitter 12 is integrated with a light source. The FSK communication interface 42 receives an input message to be transmitted. This inputted message may comprise an indication that the light source is in a particular state. For example, the inputted message may be an indication that a traffic light is red or that a pedestrian walk symbol indicates that pedestrians may cross a street. The FSK communication interface 42 outputs the input message to the FSK modulator 46 via the FSK micro-controller 44. The FSK modulator 46 is controlled by the FSK micro-controller 44 to encode the input message into an analog signal using the Varicode encoding scheme. The analog signal output by the FSK modulator 46 is filtered by the band pass filter 48. The filtered analog signal is then amplified by the amplifier 60. The amplifier 60 further converts the filtered analog signal from the band pass filter 48 into a digital signal. The digital signal is output to the driver 62.

Similarly, an input message is received by the MFSK communication interface 52 to be transmitted. The inputted message may comprise traffic conditions, weather conditions, location information of the light source, or information that is desired to be communicated to the receiver 14. The MFSK communication interface 52 outputs the inputted message to the MFSK modulator 56 via the MFSK micro-controller 54. The MFSK modulator 56 is controlled by the MFSK micro-controller 54 to encode the inputted message into an analog signal using the Varicode encoding scheme. The analog signal output by the MFSK modulator 56 is filtered by the low pass filter 58. The filtered analog signal is then amplified by the amplifier 60. The amplifier 60 further converts the filtered analog signal from the low pass filter 58 into a digital signal. The digital signal is output to the PWM driver 62.

The driver 62 generates a modulated digital signal that is receives by the switch 32. The switch 32 is controlled by the modulated digital signal to output the voltage signal from the voltage converter 28 according to the drive level controller 26. The switch 32 outputs the voltage signal. The diode 36 provides that the voltage signal does not feedback to the switch 32. The biaser 34 provides that the voltage signal output by the switch 32 is not below the bias level. The voltage signal is then received by the LED array 38. The duty cycle of the LEDs in the LED array 38 is altered in accordance with the modulated digital signal which represents the inputted messages encoded by the FSK modulator 46 and the MFSK modulator 56.

The light emitted by the LEDs in the LED array 38 is then detected by the darlington transistor 100 of the detector 70 of the receiver 14. The emitter of the second transistor 100b outputs a signal that corresponds to the received light. The low pass filter 108 filtered the signal output by the second transistor 100b. The filtered signal is amplified by the DC amplifier 110. The amplified signal is then maintained by the detector AGC 112. The signal from the detector AGC 112 is fed back to the darlington transistor 100 through the detector biaser 114.

The AGC 112 of the detector 70 outputs a signal that is maintained by the AGC 76. The AGC 112 further outputs a signal to the receiver LED 72. The receiver LED 72 is powered when a signal is received by the detector 70 such that a user of the receiver 14 knows the detector 70 is active. The AGC 112 outputs the signal according to the preset range of the demodulator 92. The signal output by the AGC 112 is received by the band pass filter 78 where it is filtered and unwanted noise is removed. The pre-amplifier 80 then amplifies the filtered signal 78. The amplified signal is then further amplified by the amplifier 82 and output to the diode 84. The diode 84 inhibits the amplified signal from feeding back to the pre-amplifier 80. In some aspects of the present disclosure, the diode 84 prevents the amplified signal from feeding back to the pre-amplifier 80. The diode 84 outputs a feedback signal to the AGC 76. The feedback signal is received by the AGC 76 and utilized to maintain the output level of the signal output by the detector 70 within the preset range. The amplified signal from the pre-amplifier 80 is further amplified by the driver amplifier 90 which is connected to the demodulator 92.

The AGC 76 further outputs the RSSI which is amplified by the first DC amplifier 86 and then received by the demodulator 92. The RSSI is used to calculate the distance between the transmitter 12 and the receiver 14 at the demodulator 92 given the known preset level of the drive level controller 26 of the transmitter 12. The demodulator 92 further receives an amplified signal from the second DC amplifier 88. The demodulator 92 processes the signal from the second DC amplifier 88 to improve the accuracy of the distance calculated from the RSSI. The demodulator 92 demodulates the amplified signal from the driver amplifier 90 and demodulates the encoded information in the received light to determine the message input into FSK communication interface 42 and the message input into MFSK communication interface 52. These two messages are output to a user by the output interface 94. As previously stated, the output interface 94 is connected to a vehicle processor into which the receiver 14 is integrated. The vehicle processor communicates state information of the vehicle to the output interface 94 which is processed to further determine the output content. For example, if the vehicle processor indicates that the turn signal indicator is active and the demodulated message from the FSK modulator 46 indicates that pedestrian walk light is active onto which the vehicle is turning, the output interface 94 processes this demodulated message and the information that the turn signal indicator is active and advises a user of the vehicle. The output interface 94 may also control the manner in which the demodulated message is output. For example, if the vehicle is moving the output interface 94 may not visually display the demodulated message, but instead convert the message to speech and output the message as synthesized speech such that the user of the vehicle is not distracted during operation of the vehicle.

While the drive level controller 26 of the transmitter 12 has been described as having a preset level that pre-determines the control signal output to the drive level controller 28, those of skill in the art will appreciate that the control signal output may be varied. For example, the control signal may be automatically or manually varied to take into account changing weather conditions.

Figure 7:
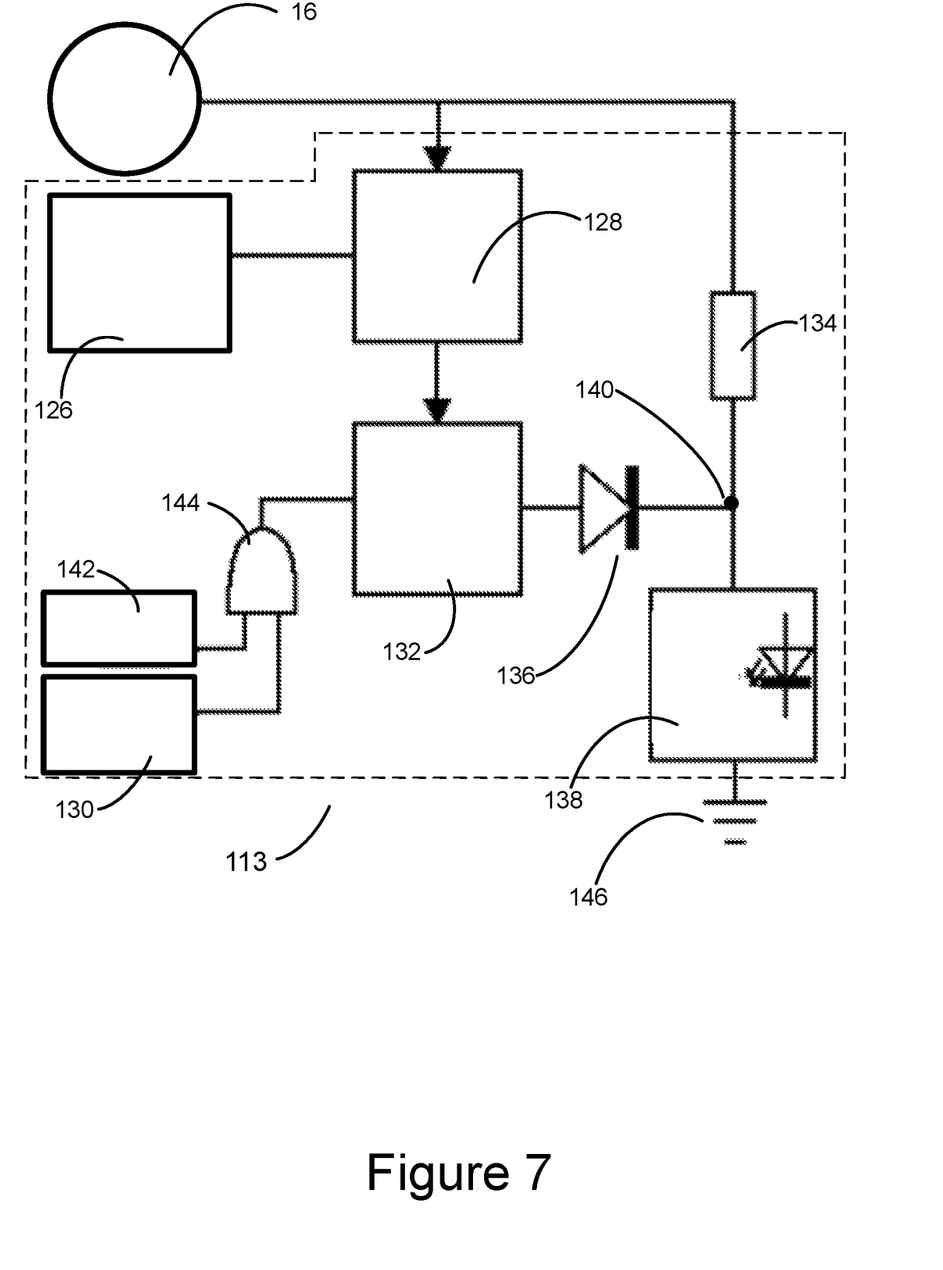
FIG. 7 is a block diagram of another form of a transmitter and the power source of the optical communication system of FIG. 1.

While a particular transmitter 12 has been described, those of skill in the art will appreciate that other transmitters are possible. Referring to FIG. 7, a block diagram of another aspect of a transmitter generally identified by reference character 113 and a power source 16 of FIG. 1 is shown. The transmitter 113 comprises a drive level controller 126, a voltage converter 128, a modulator 130, a switch 132, a biaser 134, a diode 136, a LED array 138, node 140, an LED driver 142 and an AND gate 144. The transmitter 113 is configured to be integrated with a light source, for example, a traffic light, stop light, pedestrian light, a vehicle brake light and a railway signal.

The power source 16 is electrically coupled to the switch 132 via the voltage converter 128. The power source 16 is electrically coupled to the node 140 via the biaser 134. The drive level controller 126 is electrically coupled to the switch 132 via the voltage converter 128. The modulator 130 is electrically coupled to the switch 132 via the AND gate 144. The LED driver 142 is electrically coupled to the switch 132 via the AND gate 144. The switch 132 is electrically coupled to the node 140 via the switch 136. The biaser 134 is electrically coupled to the power source 16. The biaser 134 is electrically coupled to the node 140. The node 140 is electrically coupled to the switch 132 via the diode 136. The node 140 is electrically coupled to the switch 132 via the diode 136. The node 140 is electrically coupled to the LED array 138.

The power source 16 is electrically connected to the voltage converter 128 and the biaser 134. The power source 16 outputs a DC signal to the voltage converter 128 and the biaser 134. The drive level controller 126 inputs a control signal to the voltage converter 128. The control signal controls the signal output by the voltage converter 128 to the switch 132. In this aspect, the drive level controller 126 has a preset level that pre-determines the control signal. However, those of skill in the art will appreciate that the control signal may be varied. For example, the control signal may be automatically or manually varied to take into account changing weather conditions. The voltage converter 128 is electrically connected to the switch 132. The voltage converter 128 outputs a voltage to the switch 132. The signal output to the switch 132 by the voltage converter 128 powers the LED array 138. As the voltage converter 128 is controlled by the control signal from the drive level controller 126, the voltage received by the switch 132 is a predetermined reference voltage.

The modulator 130 is electrically connected to the AND gate 144. The modulator 130 is configured to output a digital signal to the AND gate 144. The AND gate 144 is electrically connected to the switch 132. The AND gate 144 is further connected to the LED driver 142. The LED driver 142 provides an LED input signal to the AND gate 144. In this aspect, the switch 132 is a solid state switch. The digital signal from the modulator 130 controls a signal output by the switch 132 up to the reference voltage output by the voltage converter 128. The switch 132 is electrically connected to the diode 136. In this aspect, the diode 136 is a high speed Schottky diode. The biaser 134 is electrically connected to the power source 16, the diode 136 and the LED array 138. The biaser 34 receives the DC signal from the power source 16. The biaser 134 outputs a signal to the LED array 138. The biaser 134 sets a bias level so that the LEDs in the LED array 138 do not turn off entirely when the LED array 138 receive the signal from the switch 132. The diode 136 inhibits the signal output by the biaser 134 from feeding back into the switch 132. In some aspects of the present disclosure, the diode 136 inhibits the signal output by the biaser 134 from feeding back into the switch 132. The LED array 138 comprises at least one LED. The LED array 138 is electrically connected to ground 146. The LEDs in the LED array 138 emit light and pulse at varying power levels. The varying power levels are between the bias level set by the biaser 134 and the reference voltage set by the control signal output by the drive level controller 126. The modulator 130 in this aspect is the same as the modulator 30 previously described. While a single LED driver 142 is described, those of skill in the art will appreciate that more LED drivers may be used. Furthermore, more AND gates may be used in the transmitter 113 to determine the control signal for the switch 132.

During use, the LED input signal is generated according to a control signal from a controller of the light source to which the transmitter 113 is integrated. The LED driver 142 provides that the light source operates normally. For example, if the light source is a traffic light, the LED driver 142 may be driven by a control signal from the traffic light controller. Accordingly, the LED driver 142 may receive a control signal to emit red, amber or green light. The control signal controls the LED driver 142 to output the LED input signal which is received by the AND gate 144. The AND gate 144 also receives the digital signal from the modulator 130. When the LED input signal and the digital signal both indicate that the LED array 138 should be powered, the AND date outputs a control signal to the switch 132 to power the LED array 138. The LED array 138 are then powered at a power level between the bias level set by the biaser 134 and the reference voltage set by the drive level controller 126. When either of the LED input signal and the digital signal indicate that the LED array 138 should not be powered, the AND gate outputs a control signal to the switch 132 to not power the LED array 138. In this manner, information may be communicated by the LED array 138 of the transmitter 114 while still utilizing the light source in the normal manner. Thus, a driver of a vehicle, for example, will see a red, amber or green light from the light source and information may also be communicated via the LEDs in the LED array 138 as described.

Figure 8:
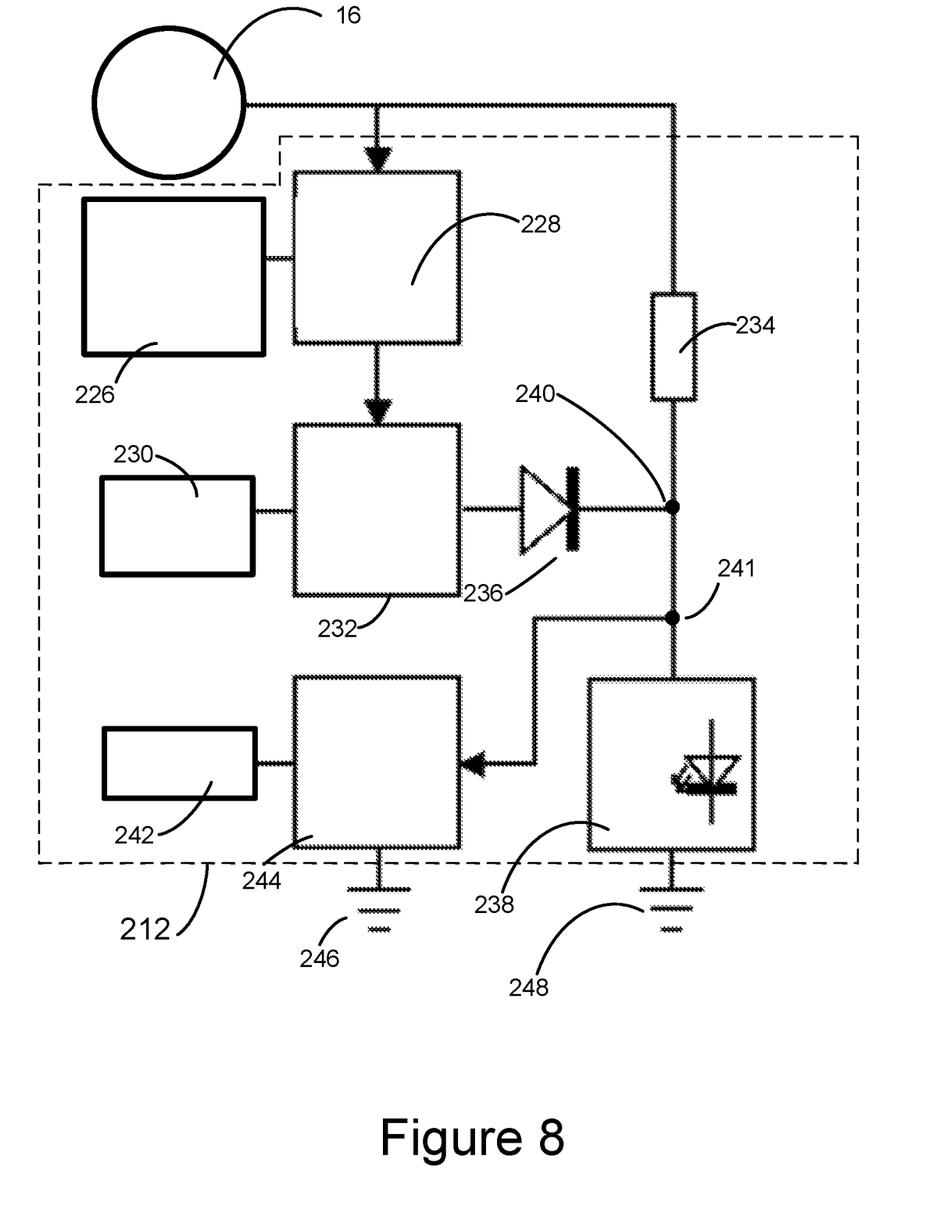
FIG. 8 is a block diagram of another form of a transmitter and the power source of the optical communication system of FIG. 1.

Referring to FIG. 8, a block diagram of another aspect of a transmitter generally identified by reference character 212 and a power source 16 of FIG. 1 is shown. The transmitter 212 comprises a drive level controller 226, a voltage converter 228, a modulator 230, a switch 232, a biaser 234, a diode 236, a LED array 238, first node 240, second node 241, a feedback comparer 242 and a level converter 244.

The power source 16 is electrically coupled to the switch 232 via the voltage converter 228. The power source 16 is electrically coupled to the first node 240 via the biaser 234. The drive level controller 226 is electrically coupled to the voltage converter 228. The voltage converter 228 is electrically coupled to the switch 232. The modulator 230 is electrically coupled to the switch 232. The switch 232 is electrically coupled to the voltage converter 228. The switch 232 is electrically coupled to the first node 240 via the diode 236. The biaser 234 is electrically coupled to the power source 16. The biaser 234 is electrically coupled to the first node 240. The first node 240 is electrically coupled to the LED array 238 via the second node 241. The feedback comparer 242 is electrically coupled to the level converter 244. The level converter 244 is electrically coupled to a first ground 246. The level converter 244 is electrically coupled to the second node 241. The second node 241 is electrically coupled to the first node 240. The second node 241 is electrically coupled to the LED array 238. The LED array 238 is electrically coupled to a second ground 248.

The power source 16 is outputs a DC signal to the voltage converter 228 and the biaser 234. The drive level controller 226 inputs a control signal to the voltage converter 228. The control signal controls the signal output by the voltage converter 228 to the switch 232. In this aspect, the drive level controller 226 has a preset level that pre-determines the control signal. However, those of skill in the art will appreciate that the control signal may be varied. For example, the control signal may be automatically or manually varied to take into account changing weather conditions. The voltage converter 228 is electrically connected to the switch 232. The voltage converter 228 outputs a voltage to the switch 232. The signal output to the switch 232 by the voltage converter 228 powers the LED array 238. As the voltage converter 228 is controlled by the control signal from the drive level controller 226, the voltage received by the switch 232 is a predetermined reference voltage.

The modulator 230 is electrically connected to the switch 232. The modulator 230 is configured to output a modulated digital signal to the switch 232 to control the switch 232. In this aspect, the switch 232 is a solid state switch. The digital signal from the modulator 230 controls a signal output by the switch 232 up to the reference voltage output by the voltage converter 228. The switch 232 is electrically connected to the diode 236. In this aspect, the diode 236 is a high speed Schottky diode. The biaser 234 is electrically connected to the power source 16, the diode 236 and the LED array 238. The biaser 234 receives the DC signal from the power source 16. The biaser 234 outputs a signal to the LED array 238. The biaser 234 sets a bias level so that the LEDs in the LED array 238 do not turn off entirely when the LED array 238 receive the signal from the switch 232. The diode 236 inhibits the signal output by the biaser 234 from feeding back into the switch 232. In some aspects of the present disclosure, the diode 236 prevents the signal output by the biaser 234 from feeding back into the switch 232. The LED array 238 comprises at least one LED. The LED array 238 is electrically connected to ground 240. The LEDs in the LED array 238 emit light and pulse at varying power levels. The varying power levels are between the bias level set by the biaser 234 and the reference voltage set by the control signal output by the drive level controller 226. The modulator 230 in this aspect is the same as the modulator 30 previously described.

The feedback comparer 242 is electrically connected to the level converter 244. The level converter 244 is electrically connected to the second ground 246 and to the output of the diode 236 and the biaser 234. The level converter 244 receives the output of the biaser 234 and the diode 236 and coverts this signal so that it may be compared by the feedback comparer 242. The feedback comparer 242 receives the modulated digital signal from the driver 62 and the converted signal from the level converter 244. The feedback comparer 242 compares the converted signal to the output signal to monitor the performance of the transmitter 212.

While the transmitters 112 and 212 have been described separately, those of skill in the art will appreciate that elements of each transmitter 113 and 212 may be used in the other transmitter 113 and 212. For example, the transmitter 113 may incorporate the feedback comparer 242, the level converter 244 and the second ground 246 of the transmitter 212. Furthermore, the transmitter 212 may incorporate the LED driver 142 and the AND gate 144 of the transmitter 113.

Figure 9:
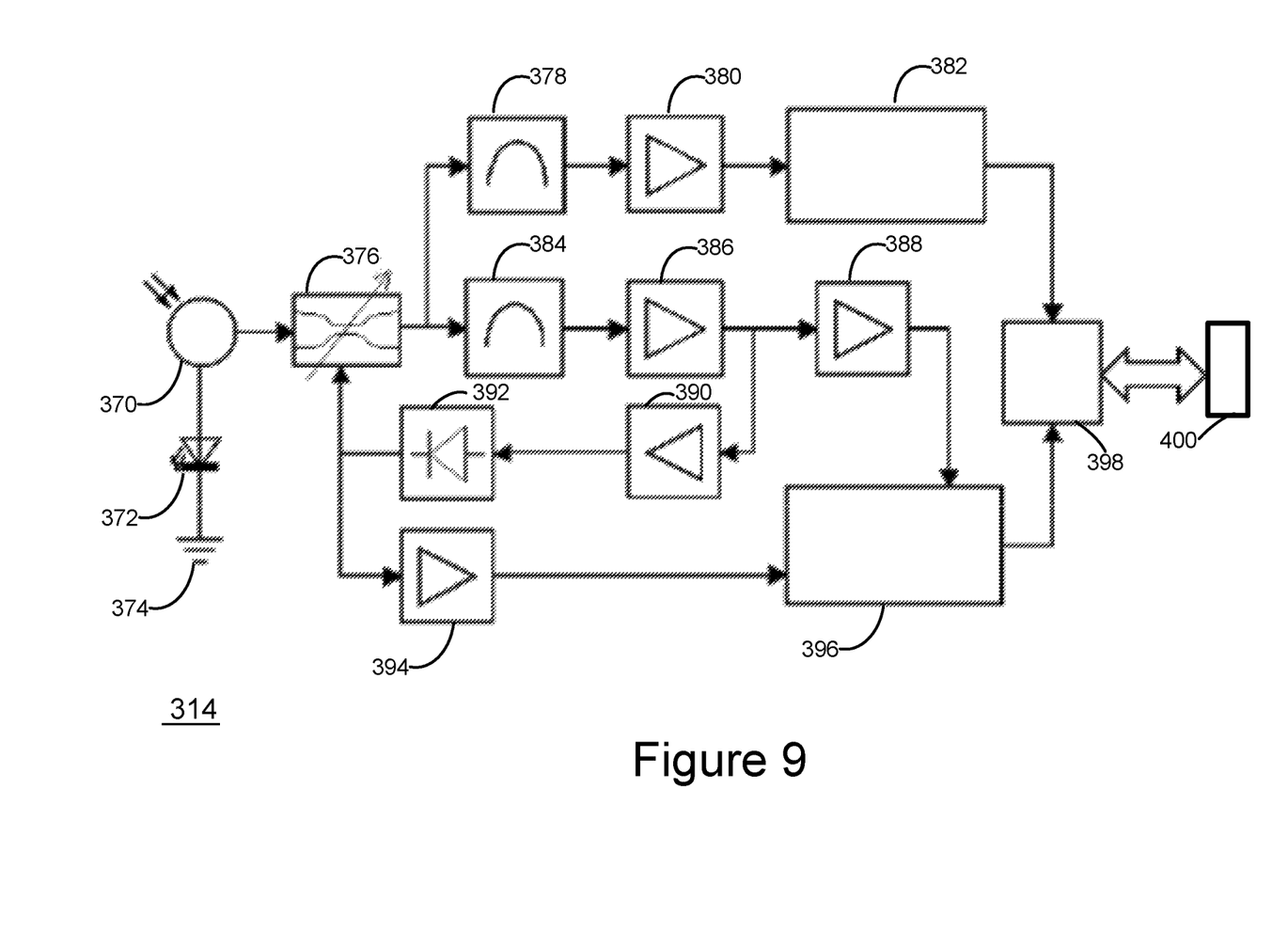
FIG. 9 is a block diagram of another form of a receiver of the optical communication system of FIG. 1

While a particular receiver 14 has been described, those of skill in the art will appreciate that other transmitters are possible. Referring to FIG. 9, a block diagram of another aspect of a receiver generally identified by reference character 314 of FIG. 5 is shown. The receiver 314 is configured to receive light transmitted by the transmitter 12, 112, 212 and decode the received light to retrieve the information as will be described.

The receiver 314 comprises a detector 370, a receiver LED 372, an AGC 376, a first band pass filter 378, a first driver amplifier 380, an FSK demodulator 382, a second band pass filter 384, a first pre-amplifier 386, a second driver amplifier 388, a second pre-amplifier 390, a diode 392, a DC amplifier 394, an MFSK demodulator 396, a collector 398 and an output interface 400. The detector 370 is electrically coupled to the receiver LED 372. The detector 370 is electrically coupled to the AGC 376. The AGC 376 is electrically coupled to the FSK demodulator 382 via the first band pass filter 378 and the first driver amplifier 380. The AGC 376 is electrically coupled to the MFSK demodulator 396 via the DC amplifier 394. The AGC 376 is electrically coupled to the MFSK demodulator 396 via the second band pass filter 384, the first pre-amplifier 386 and the second driver amplifier 388. The first band pass filter 378 is electrically coupled to the AGC 376. The first band pass filter 348 is electrically coupled to the first driver amplifier 380. The first driver amplifier 380 is electrically coupled to the first band pass filter 378. The first driver amplifier 380 is electrically coupled to the FSK demodulator 382. The second band pass filter 384 is electrically coupled to the AGC 376. The second band pass filter 384 is electrically coupled to the first pre-amplifier 386. The first pre-amplifier 386 is electrically coupled to the second band pass filter 384. The first pre-amplifier 386 is electrically coupled to the second driver amplifier 388. The first pre-amplifier 386 is electrically coupled to the second pre-amplifier 390. The second river amplifier 388 is electrically coupled to the first pre-amplifier 386. The second river amplifier 388 is electrically coupled to the MFSK demodulator 396. The second pre-amplifier 390 is electrically coupled to the first pre-amplifier 386 and the second driver amplifier 388. The second pre-amplifier 390 is electrically coupled to the AGC 376 and the DC amplifier 394 via the diode 392. The diode 392 is electrically coupled to the second pre-amplifier 390. The diode 392 is electrically coupled to the AGC 376 and the DC amplifier 394. The DC amplifier 394 is electrically coupled to the AGC 376. The DC amplifier 394 is electrically coupled to the second pre-amplifier 390 via the diode 392. The DC amplifier 394 is electrically coupled to the MFSK demodulator 396. The FSK demodulator 382 is electrically coupled to the collector 398. The MFSK demodulator 396 is electrically connected to the collector 398. The collector 398 is electrically coupled to the FSK demodulator 382. The collector 398 is electrically coupled to the MFSK demodulator 396. The collector 398 is electrically coupled to the output interface 400.

The detector 370 is configured to receive light emitted by LEDs of the LED array 38 of the transmitter 12 and convert the light into a signal. The detector 370 is the same as the detector 70 previously described. The detector 370 is electrically connected to the receiver LED 372 which is electrically connected to ground 374. The receiver 372 emits light when the detector 370 is detecting an emitted light signal such that an operator may confirm that the detector 370 is functioning.

The detector 370 is also electrically connected to the AGC 376. The AGC 376 is configured to maintain the output level of the signal output by the detector 370 within a preset range. The preset range is pre-determined based on the operating ranges of the FSK demodulator 382 and the MFSK demodulator 396. In this aspect, the operating ranges of the FSK demodulator 382 and the MFSK demodulator 396 are the same. In this aspect, the operating ranges are from near 0 V to up to approximately 5 V. The AGC 376 is electrically connected to the first band pass filter 378 and the second band pass filter 384.

The first band pass filter 378 is configured to limit the frequency range of the signal output by the AGC 376. If the frequency of the driver 62 is 30 kHz, for example, the frequency of the AGC 376 ranges from 1 kHz to 15 kHz. The first band pass filter 378 removes unwanted noise from the signal output by the AGC 376. The first band pass filter 378 is electrically connected to the first driver amplifier 380. The first driver amplifier 380 amplifies the signal output by the first band pass filter 378. The first driver amplifier 380 is electrically connected to the FSK demodulator 382. The FSK demodulator 382 is configured to demodulate the received signal into digital information from the first linear stage. In this aspect, the FSK demodulator 382 is a DSP. The FSK demodulator 382 is electrically connected to the collector 398.

The second band pass filter 384 is configured to limit the frequency range of the signal output by the AGC 376. If the frequency of the driver 62 is 30 kHz, for example, the frequency of the AGC 376 ranges from 1 kHz to 15 kHz. The second band pass filter 384 removes unwanted noise from the signal output by the AGC 376. The second band pass filter 384 is electrically connected to the first pre-amplifier 386. The first pre-amplifier 386 is electrically connected to the second driver amplifier 388 and the second pre-amplifier 390. The second driver amplifier 388 amplifies the signal output by the first pre-amplifier 386. The second driver amplifier 388 is electrically connected to the MFSK demodulator 396. The MFSK demodulator 396 is configured to demodulate the received signal into digital information from the second linear stage. In this aspect, the MFSK demodulator 396 is a DSP. The MFSK demodulator 396 is electrically connected to the collector 398.

The second pre-amplifier 390 is electrically connected to the diode 392. In this aspect, the diode 392 is a half wave rectifier. The half wave rectifier converts the input AC voltage to an output DC voltage. The diode 394 is electrically connected to the AGC 376 and the DC amplifier 394. The diode 394 outputs a feedback signal to the AGC 376. The feedback signal is received by the AGC 376. The AGC 376 utilizes the feedback signal to maintain the output level of the signal output by the detector 370 within the preset range.

The AGC 376 further outputs a received signal strength indicator (RSSI). The RSSI is an indication of the signal strength of the light detected by the detector 370. The RSSI is output from the AGC 376 and amplified by the DC amplifier 394. The DC amplifier 394 is electrically connected to the MFSK demodulator 396. The preset level of the drive level controller 26 of the transmitter 12 is known to the MFSK demodulator 396. Thus, the RSSI is used to calculate the distance between the transmitter 12 and the receiver 314 at the MFSK demodulator 396 given the known preset level of the drive level controller 26 of the transmitter 12.

The collector 398 collects the demodulated digital information from the FSK demodulator 382 and the MFSK demodulator 396. The collector 398 is electrically connected to the output interface 400.

The output interface 400 receives the digital information converted from the received signals from the FSK demodulator 382 and the MFSK demodulator 396. The output interface 400 outputs this digital information such that the information may be received by an operator of the receiver 314. In this aspect, the output interface 400 is a display screen such that a user may view the information.

Furthermore, in this aspect, the output interface 400 is connected to a vehicle processor (not shown) into which the receiver 314 is integrated. The vehicle processor communicates state information of the vehicle to the output interface 400 which is processed to further determine the information output by the output interface 400.

While the FSK demodulator 382 and the MFSK demodulator 396 have been described as DSPs, those of skill in the art will appreciate that other elements are possible. In another aspect, at least one of the FSK demodulator 382 and the MFSK demodulator 396 is a micro-controller chip.

While a particular output interface 400 has been described, those of skill in the art will appreciate that other output interfaces are possible. For example, the output interface 400 may be a speaker that converts text to speech, a light source or some other form of information communication mechanism.

Although aspects of the present disclosure have been described above with reference to the figures, those of skill in the art will appreciate that variations and modifications may be made without departing from the scope thereof as defined by the appended claims.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An optical communication system comprising:
  a transmitter comprising:
    a modulator configured to output a modulated digital signal representing information to be transmitted;
    a biaser configured to output a bias level;
    a drive level controller configured to output a control signal;
    a switch electrically connected to the modulator, wherein the switch receives the digital signal and a reference voltage set by the control signal; and
    at least one light emitting diode (LED) electrically connected to the switch and the biaser, wherein the LED is configured to emit light and pulse at varying power levels between the bias level and the reference voltage; and
  a receiver comprising:
    a detector configured to receive light emitted by the LED and output a detected signal; and
    a demodulator configured to receive the detected signal and output demodulated information.

2. The system of claim 1, wherein the digital signal alters a duty cycle of the LED.

3. The system of claim 1, wherein the digital signal is a pulse width modulated (PWM) digital signal or a pulse phase modulated (PPM) digital signal.

4. The system of claim 1, wherein the control signal is a preset signal or the control signal is variable such that reference voltage may be varied.

5. The system of claim 1, wherein the transmitter further comprises a voltage converter controlled by the control signal and configured to output the reference voltage.

6. The system of claim 1, wherein modulator comprises a first linear stage and a second linear stage.

7. The system of claim 6, wherein the first linear stage comprises a frequency shift keying (FSK) modulator configured to output an analog FSK signal, and wherein the second linear stage comprises a multiple frequency shift keying (MFSK) modulator configured to output an analog MFSK signal.

8. The system of claim 6, wherein the modulator comprises an amplifier configured to combine an analog signal output by the first linear stage and an analog signal output by the second linear stage using frequency division multiplexing (FDM) into the digital signal.

9. The system of claim 1, wherein the transmitter is integrated into a traffic light and the receiver is integrated into a vehicle.

10. The system of claim 9, wherein the digital signal represents state information of the traffic light.

11. The system of claim 1, wherein the transmitter is integrated into a first vehicle and the receiver is integrated into a second vehicle.

12. A transmitter comprising:
  a modulator configured to output a modulated digital signal representing information to be transmitted;
  a biaser configured to output a bias level;
  a drive level controller configured to output a control signal;
  a switch electrically connected to the modulator, wherein the switch receives the digital signal and a reference voltage set by the control signal; and
  at least one light emitting diode (LED) electrically connected to the switch and the biaser, wherein the LED is configured to emit light and pulse at varying power levels between the bias level and the reference voltage.

13. The transmitter of claim 12, wherein the digital signal alters a duty cycle of the LED.

14. The transmitter of claim 12, wherein the digital signal is a pulse width modulated (PWM) digital signal or a pulse phase modulated (PPM) digital signal.

15. The transmitter of claim 12, wherein the control signal is a preset signal or the control signal is variable such that the reference voltage may be varied.

16. The transmitter of claim 12, further comprising a voltage converter controlled by the control signal and configured to output the reference voltage.

17. The transmitter of claim 12, wherein the modulator comprises a first linear stage and a second linear stage.

18. The transmitter of claim 17, wherein the first linear stage comprises a frequency shift keying (FSK) modulator configured to output an analog FSK signal, and wherein the second linear stage comprises a multiple frequency shift keying (MFSK) modulator configured to output an analog MFSK signal.

19. The transmitter of claim 17, wherein the modulator comprises an amplifier configured to combine an analog signal output by the first linear stage and an analog signal output by the second linear stage using frequency division multiplexing (FDM) into the digital signal.

20. A receiver comprising:
a detector configured to receive light emitted by a light emitting diode (LED) and output a detected signal, wherein the detector comprises a darlington transistor configured to receive a feedback signal to control a sensitivity of the darlington transistor; and
a demodulator configured to receive the detected signal and output demodulated information and to receive a received signal strength indicator (RSSI), wherein the RSSI is processed by the demodulator to calculate the distance between the receiver and the LED.

* * * * *